June 27, 1933.  R. J. DEVILLERS  1,915,649

MOTOR VEHICLE PROVIDED WITH FOUR INDEPENDENT WHEELS

Filed Jan. 25, 1929

Patented June 27, 1933

1,915,649

UNITED STATES PATENT OFFICE

RENÉ JEAN DEVILLERS, OF PARIS, FRANCE, ASSIGNOR, BY MESNE ASSIGNMENTS, TO DAIMLER-BENZ AKTIENGESELLSCHAFT, OF STUTTGART-UNTERTURKHEIM, GERMANY, A CORPORATION OF GERMANY

REISSUED

MOTOR VEHICLE PROVIDED WITH FOUR INDEPENDENT WHEELS

Application filed January 25, 1929, Serial No. 335,084, and in France January 27, 1928.

This invention relates to motor vehicles with independently spring-supported wheels and the object is to provide a construction of such vehicle which will be easy steering and easy riding and at the same time steady and stable.

My invention may be understood by reference to the following description taken in connection with the accompanying drawing illustrating in a diagrammatic manner a single embodiment thereof and in which:—

In the customary mounting of automobile bodies with the two front or steering wheels on a single axle or transverse member from which the body is spring-supported, disadvantages arise from gyroscopic reactions of the wheels which set up forces in opposition to those given to the steering mechanism by the hand of the driver and which cause the well known "shimmying" movement of the front wheels. These disadvantages have been remedied by mounting the front wheels for independent movement and in such manner that they may move in planes parallel to the central longitudinal plane of the vehicle. One such arrangement, not new in itself, is herein shown diagrammatically in Fig. 1 wherein the front wheels are guided for rectilinear movement by the spring cylinder and piston suspension 3. I have just described this mounting as one in which the wheels are guided for movement in planes parallel to the central longitudinal plane of the body, believing that this language when read in connection with the showing of Fig. 1 most quickly conveys the idea involved. Analysis, however, will show that the expression is inexact. Since the front wheels are turned in the steering movement, it is the usual substantially vertically steering pivot (not illustrated) which moves in a plane parallel to the central plane and here again the language may be slightly inaccurate on account of possible camber of the pivot, but the motion in question will be well understood by those skilled in the art aside from such niceties of expression.

In an attempt to obtain the advantages with respect to steering arising from such a mounting of the front wheels and also to obtain the advantages arising when the vehicle is passing over a rough road from independently spring-supported wheels, vehicles have been constructed in which both rear wheels and front wheels have been mounted in the manner described. Vehicles thus constructed, however, do not hold the road well and the comfort of the occupants is diminished because of a tendency which they show to accentuated rolling movement as compared with ordinary motor cars. The scientific experiments made by me have demonstrated that there was a serious error of conception in constructing cars in this manner and in accordance with my present invention I have therefore provided for independent mounting of the rear wheels in a quite different manner.

Figure 1:
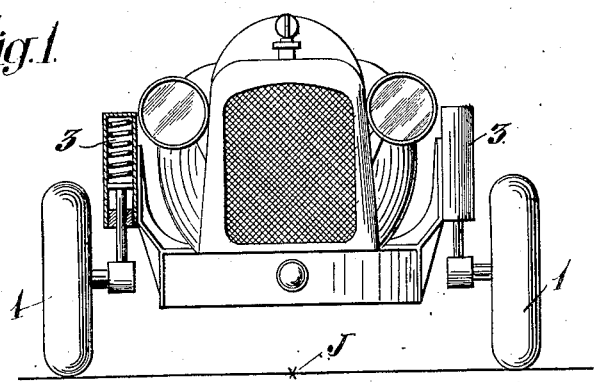
Fig. 1 is a front end elevation of the motor vehicle.

The subject may be understood from the following analysis. Referring to Fig. 1, if we imagine the vehicle shown as turning a corner, the body of the car under the influence of centrifugal force will lean over towards the outside of the curve and take an inclined position. The wheels 1, however, because of their method of mounting remain in planes equidistant from the central plane of the body. Consequently, when the body inclines, the front wheels 1 take a similarly inclined position. The resistance of the road acts at the ground-engaging portions of the tires and the wheels tilt laterally about these points as pivots located on the surface of the road. The body of the car follows the movement of the wheels and pivots about a point J also located on the road surface.

Now, if the rear wheels are similarly arranged, the axis of motion of the car body as a whole is located at the road surface relatively remote from the center of gravity and the center of gravity acts through a relatively long lever arm tending to upset the body, or, considering another aspect, the center of gravity being relatively remote from the center of oscillation, the amplitude of the lateral oscillations or rollings of the car body is great.

Figure 3:
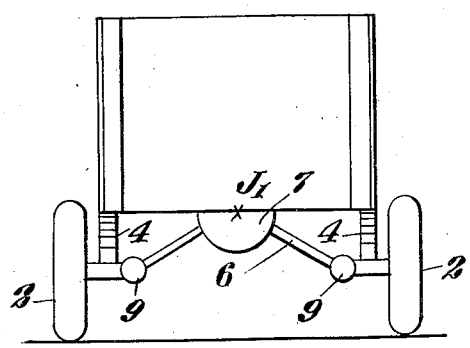
Fig. 3 is a rear end elevation.

In accordance with my invention I therefore mount the rear wheels 2 so as to permit angular swinging movement of their planes with respect to the central longitudinal plane of the body. Thus in Fig. 3 I have by way of example shown the rear wheels 2 as mounted on half axles 6 and driven through Cardan or universal joints at 7 and 9. I prefer to support the axles from the body by means of longitudinally disposed leaf springs 4.

It will be apparent that since the wheels 2 are independently mounted they may move to pass over obstacles without tilting the body. Under conditions such as above described tending to tilt the body the action at the rear of the car is quite different from the action at the forward end as described in connection with Fig. 1. The body of the car can tip while the rear wheels maintain their vertical position. In the case of turning a corner the rear wheels 2 maintain their vertical position and the body in tipping swings about the axis $J_1$, the pivotal center of the spring-supported half axles. In so swinging the car compresses the spring towards which it tips and permits expansion of the other.

Figure 2:
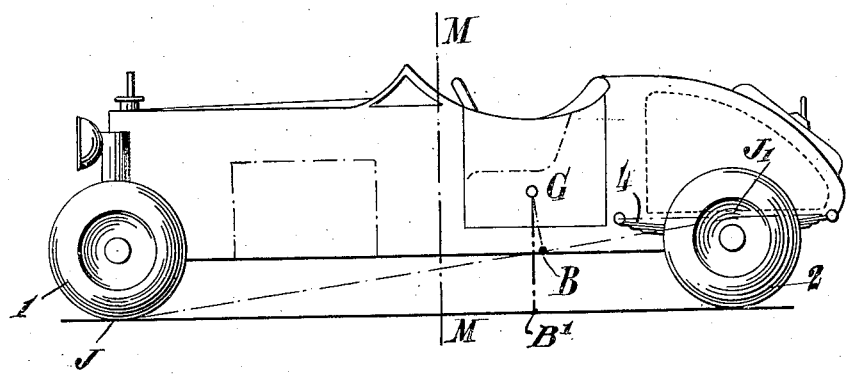
Fig. 2 is a side elevation.

These two centers of movement J and $J_1$ define an axis about which the body as a whole swings, which is line J—$J_1$ in Fig. 2. If G is the center of gravity, the lever arm through which the mass of the car works, which determines the likelihood of its tipping over and the amplitude of its rolling oscillations, is the distance G—B in Fig. 2, whereas in the case of a car both ends of which are mounted as shown in Fig. 1 or by equivalent means this lever arm would be the distance from the center of gravity to the ground, the line G—$B_1$. A vehicle embodying my invention, therefore, is stable against overturning movement and steady as regards transverse oscillations and in these points compares favorably with vehicles of standard construction in which the wheels of each pair are not independently supported while gaining the cushioning advantages of individual wheel suspension and the steering advantages of constructions of the type illustrated in Fig. 1.

As seen from the location of the line J—$J_1$ in Fig. 2, if the height of the center of gravity above the road surface remains the same, the length of the lever arm G—B decreases as the center of gravity moves rearwardly. Consequently it is obvious that the further to the rear that the center of gravity lies, the more fully the advantages of the invention are realized, and while the scope of my invention in its broader aspects is not limited to the location of the center of gravity, I prefer to locate this center as much as possible towards the rear or at least rearwardly of the central transverse plane M—M.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A motor vehicle comprising an underframe having front and rear pairs of wheels, each wheel independently connected to the underframe and spring-supported for individual movement, the front wheels having substantially vertical pivots providing for steering movement and each being mounted to move up and down with successive positions of its pivot substantially parallel and substantially equidistant from the central longitudinal plane of the vehicle whereby to define a swinging center for the body at the ground and the rear wheels each being mounted to permit angular swinging movement of their planes relative to such central plane whereby to define an elevated swinging center for the body, the two centers defining an inclined axis of oscillation for the body as a whole.

2. A motor vehicle as defined in claim 1 wherein the mass thereof is distributed to define a rearwardly located center of gravity, that is, nearer the rear wheels than to the front wheels.

3. A motor vehicle comprising an underframe having front and rear pairs of wheels, each wheel independently connected to the underframe and spring-supported for individual movement, the front wheels having substantially vertical pivots providing for steering movement and each being mounted to move up and down with successive positions of its pivot substantially parallel and substantially equidistant from the central longitudinal plane of the vehicle whereby to define a swinging center for the body at the ground and the mounting for the rear wheels comprising half axles each carrying a wheel and mounted for swinging movement in planes transverse to the aforesaid central plane under control of the springs whereby to define an elevated swinging center for the body, the two centers defining an inclined axis of oscillation for the body as a whole.

In testimony whereof I have signed my name to this specification.

RENÉ JEAN DEVILLERS.